Figure 3:
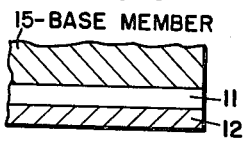

June 19, 1956   J. W. KEIL   2,751,314
BONDING SILICONE RUBBER TO SOLID MATERIALS
Filed Nov. 3, 1954

INVENTOR.
JOSEPH W. KEIL
BY Robert F. Fleming Jr.

ATTORNEY 2,751,314

Patented June 19, 1956

2,751,314

BONDING SILICONE RUBBER TO SOLID MATERIALS

Joseph W. Keil, Midland, Mich., assignor to Dow Corning Corporation, Midland, Mich., a corporation of Michigan Application November 3, 1954, Serial No. 466,470

12 Claims. (Cl. 117—72)

This invention relates to a novel method of adhering silicone rubber to a solid surface and is a continuation-in-part of the copending application, Serial No. 460,843, filed October 7, 1954, and now abandoned.

Organopolysiloxane elastomers, usually called silicone rubbers, are well-known, commercially available products. The excellent characteristics of silicone rubber such as thermal stability, dielectric properties, resistance to atmospheric deterioration, chemical inertness, non-toxicity and retention of properties at extremes of temperatures has obtained for it an increasing popularity in industry. Many of the applications for silicone rubber involve anchoring or adhering it to a solid surface.

The problem of obtaining satisfactory bonding between silicone rubber and other materials has been vexatious because several methods have been disclosed which work satisfactorily for some few silicone rubbers and/or some few solid materials but no single means has been known for bonding any and all silicone rubbers to virtually any solid material.

The heretofore known methods of achieving a bond between silicone rubber and a solid material have been unsatisfactory for a number of reasons including: expense in time and/or money; unsatisfactory bonding at extremes of temperature (i. e., −50° C. and 250° C.); failure of the bond with time; inadequate bonding; and a host of other deficiencies.

The primary object of this invention is to provide a relatively simple, inexpensive method of bonding any silicone rubber to any solid surface. A further object is to provide a method of obtaining a stronger, more durable bond between silicone rubber and a solid surface than has heretofore been available. Other objects and advantages obtained through this invention are detailed in or will be apparent from the following specification and the appended claims.

These objectives are reached by applying to the solid surface a coating of the titanium compounds defined infra and applying to the primed surface a silicone rubber containing an alkyl polysilicate.

More specifically this invention relates to a method of adhering silicone rubber to a solid surface consisting of depositing on the desired solid surface a coating (a) consisting essentially of 50 to 100 per cent by weight of a titanium compound selected from the group consisting of titanium compounds of the general formula Ti(OR)$_4$ and hydrocarbon soluble partial hydrolyzates thereof in which compound R is selected from the group consisting of aliphatic hydrocarbon radicals of less than 13 carbon atoms, and hydroxylated aliphatic hydrocarbon radicals of less than 13 carbon atoms and containing less than 4 hydroxyl radicals and 0–50 per cent by weight of a partially hydrolyzed alkyl polysilicate; and thereafter depositing on layer (a), as a second layer, (b) a mixture consisting essentially of (1) 1 to 10 per cent by weight of a partially hydrolyzed alkyl polysilicate and (2) 90 to 99 per cent by weight of a toluene soluble organopolysiloxane consisting essentially of 50 to 100 mol per cent dimethylsiloxane units, and 0 to 50 mol per cent organopolysiloxane units of the formula

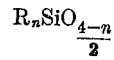

where R represents monovalent hydrocarbon radicals and $n$ has an average value of about 2. If desired, another layer (c) can be deposited on layer (b) and can consist of either any silicone rubber or any silicone adhesive.

Figure 1:
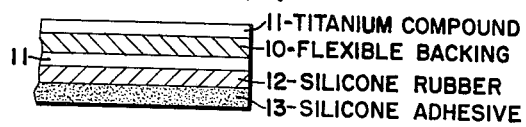
Figure 2:
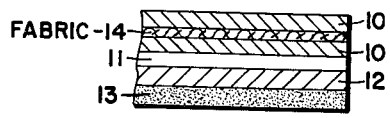

The accompanying drawings illustrate in section specific embodiments of this invention. Figure 1 is a sectional view of a portion of a pressure-sensitive tape comprising a flexible backing 10 both sides of which have deposited thereon a layer of dried titanium compound 11 and on one side of said backing 10 there being additionally a layer of a silicone rubber 12 containing a small amount of alkyl polysilicate and a layer of silicone adhesive 13. Figure 2 differs from Figure 1 in that the backing material 10 is deposited on a fabric 14, and the backside of the backing (i. e., the side opposite the adhesive 13) is not coated with dried titanium compound.

Figure 4:
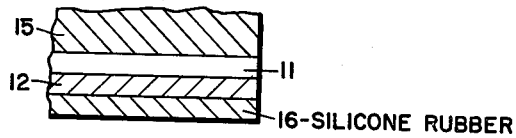

Figure 3 illustrates in section another embodiment of this invention comprising a base member 15 of metal, glass or other rigid solid material, a dried coating 11 of the titanium compounds (a) defined above and a layer 12 of an alkyl polysilicate containing silicone rubber (b). Figure 4 differs from Figure 3 in that a layer of silicone rubber 16 free of alkyl polysilicate is deposited on and anchored to the silicone rubber layer 12 containing alkyl polysilicate.

Any flexible or non-flexible solid material can be adhered to silicone rubber by the method of this invention. Specific examples of the solid materials which can be used to make the assemblies of this invention include metals such as aluminum, steel, lead, copper, platinum, gold and tin; glass and other ceramic materials and glass cloth or glass cloth coated with organosilicon resins; asbestos and organic materials such as cellulose esters, for example, cellulose acetate, cellulose butyrate, cellulose nitrate, and cellulose propionate; cellulose ethers, for example, ethyl cellulose, butyl cellulose and benzyl cellulose; vinyl polymers, for example polyvinylchloride, polyvinylalcohol, and copolymers of vinylchloride and vinylacetate, and vinylchloride and vinylidene chloride; polystyrene; polyamides; polyesters such as ethylene-glycol-terephthalates; polyethylene; fluorocarbon polymers, for example polytetrafluoroethylene, and polychlorotrifluoroethylene; organic elastomers, for example natural rubber, G. R. S., Buna-S, chloroprene, neoprene, butadiene-styrene copolymers, acrylonitrile-butadiene copolymers, and mixtures thereof; siloxane elastomers; sulfur containing elastomers such as ethylene polysulfides; acrylic polymers such as methylmethacrylate, acrylonitrile and methacrylate polymers and copolymers thereof; organic fabrics such as cotton, silk, wool, rayon, and any of the various synthetic organic fabrics; and wood.

The titanium compounds (a) serving as priming agents on the backing materials are titanium esters having the general formula Ti(OR)$_4$, where R represents an aliphatic hydrocarbon radical of less than 13 carbon atoms and/or hydroxylated aliphatic hydrocarbon radicals of less than 13 carbon atoms and containing less than 4 hydroxyl radicals and/or partially hydrolyzed Ti(OR)$_4$ compounds that are substantially soluble in hydrocarbon solvents. The various R groups on any one Ti atom can be the same or different. Examples of titanium compounds operative herein include tetramethyl titanate, tetraethyl titanate, tetradecyl titanate, octylene glycol titanate, tetra 2-ethylhexyl titanate, tetradodecyl titanate, tetraisopropyl titanate, and any mixtures thereof. It is preferred that the R groups contain at least 3 carbon atoms.

These esters are ordinarily prepared by an ester interchange employing a titanium ester such as tetramethyl titanate with a higher boiling alcohol. For example, octylene glycol titanate is readily prepared by reacting octylene glycol with tetramethyl titanate in molar proportion of 4 to 1. Partially hydrolyzed $Ti(OR)_4$ compounds can be employed if the hydrolysis has not rendered the compounds insoluble in hydrocarbon solvents such as toluene. When partially hydrolyzed titanium compounds are employed herein, particular care is necessary to prevent undue formation of $TiO_2$. On the basis of commercial availability, tetrabutyl titanate is preferred.

The titanium compounds (a) as described supra can be employed alone or can be mixed with from 0 to 50 percent by weight of any alkyl polysilicate such as methyl polysilicate, ethyl polysilicate and butyl polysilicate or mixtures thereof.

The titanium compounds or mixtures of titanium compounds and alkyl polysilicate are best applied to the backing 10 or base member 15 from a solvent solution by any suitable means such as brushing, spraying and/or dipping. The solvent solution contains preferably .5 to 10 percent by weight of the titanium compound or mixture of titanium compound and alkyl polysilicate in an organic solvent such as xylene, toluene, and/or Stoddard solvent. The titanium compound or titanium compound and alkyl polysilicate forms a continuous film on the backing as the solvent evaporates. When flexible backings are employed it is preferred that relatively thin flexible films be formed rather than thick layers which tend to craze and crack off because they lack the requisite flexibility.

A layer 12 of organopolysiloxane-alkyl polysilicate (b) is deposited on the titanium layer 11. Composition (b) contains 1 to 10 percent by weight of an alkyl polysilicate in which the alkyl groups have less than 6 carbon atoms such as, for example, methyl polysilicate, ethyl polysilicate and butyl polysilicate, and 90 to 99 percent by weight of a toluene soluble organopolysiloxane consisting essentially of 50 to 100 mol per cent dimethylsiloxane units and 0 to 50 mol percent of organosiloxane units of the formula $$R_nSiO_{\frac{4-n}{2}}$$

These organopolysiloxanes can be homopolymers, copolymers or mixtures and can vary from thin fluids to gum-like materials having viscosities exceeding 10,000,000 cs. at 25° C. There can be present monoorganosiloxane units, diorganosiloxane units and triorganosiloxane units so long as the average degree of substitution is about 2. The R groups can be any monovalent hydrocarbon radicals such as alkyl radicals for example methyl, ethyl, and octadecyl; aryl radicals for example phenyl and anthracyl; alkaryl radicals for example tolyl, xylyl and methyl naphthyl; aralkyl radicals for example benzyl and phenylethyl; cycloaliphatic radicals for example cyclohexyl, cyclohexenyl, and cyclopentyl; and alkenyl radicals for example vinyl and allyl.

The organopolysiloxane-alkyl polysilicate mixture (b) is vulcanized in situ. To accomplish such vulcanization, organic peroxides such as benzoyl peroxide, t-butylperbenzoate and halobenzoyl peroxides can be admixed therein and vulcanization accomplished by heating the mixture after it is in place. However, room temperature vulcanization such as is described, for example, in copending applications Serial No. 323,950 filed December 3, 1952, and now abandoned, and Serial No. 411,281 filed February 18, 1954, can also be accomplished and organosiloxane rubber which is so vulcanized is also operative herein. Metallic vulcanizing agents such as carboxylic acid salts of metals ranging from lead to manganese inclusive in the electromotive series of metals, said acid radicals having less than 16 carbon atoms as more fully set forth in said copending application Serial No. 411,281, can be employed herein to accomplish the necessary vulcanization.

The method by which vulcanization of the organopolysiloxane-alkyl polysilicate layer is accomplished is not critical. Any of the well-known vulcanizing agents can be included herein. Any of the well-known silicone rubber fillers can also be included herein.

The organopolysiloxane-alkyl polysilicate layer can be applied from a solvent solution of such materials in an organic solvent such as benzene and toluene, or it can be applied without any dilution. Application can be accomplished by spraying, brushing, dipping, doctoring, or any other desired method.

In order to make pressure-sensitive tapes by the method of this invention a layer 13 of a silicone adhesive (c) is applied to layer 12. Any silicone adhesive and/or adhesive containing organopolysiloxanes can be employed herein. For example, suitable adhesives are those described in applicant's copending application Serial No. 426,554 filed April 29, 1954. The preferred silicone adhesive compositions consist essentially of 5 to 70 percent by weight of a benzene soluble resin copolymer of $SiO_2$ units and $R_3SiO_{1/2}$ units, where R is an alkyl radical of less than 4 carbon atoms or a phenyl radical, and where the ratio of $R_3SiO_{1/2}$ to $SiO_2$ units is from .6:1 to .9:1 inclusive, and 95 to 30 percent by weight of a diorganopolysiloxane having the general formula $R'_2SiO$, where R' is methyl or phenyl and having a viscosity of at least 1,000,000 cs. at 25° C., and at least 90 percent of the total number of R and R' radicals being methyl. The silicone adhesive can best be applied from a solution in an organic solvent. The solvent is driven off and the silicone adhesive cured.

Alternatively, silicone rubber layer 16 can be applied on the layer of silicone rubber 12 which contains alkyl polysilicate. This layer 16 of silicone rubber consists of a toluene soluble organopolysiloxane of the general unit formula $$R_nSiO_{\frac{4-n}{2}}$$

where R is any monovalent hydrocarbon radical such as, for example, alkyl radicals such as methyl, ethyl and octadecyl; aryl radicals such as phenyl and anthracyl; alkaryl radicals such as tolyl, xylyl and methylnaphthyl; aralkyl radicals such as benzyl and phenylethyl; cycloaliphatic radicals such as cyclohexyl, cyclohexenyl, and cyclopentyl; and alkenyl radicals such as vinyl and allyl, and $n$ has a value of 1.99 to 2.0. There can be present monoorganosiloxane units, diorganopolysiloxane units and triorganosiloxane units so long as the average degree of substitution is within the specified range. Any of the well-known silicone rubber fillers, vulcanizing agents and additives can be present in these silicone rubbers.

Throughout this specification the specific embodiments of this invention have been expressed as three or four layer assemblies including: (1) a layer of a solid base member or backing material; (2) a layer of the defined titanium compounds with or without alkyl polysilicate; (3) a layer of silicone rubber containing an alkyl polysilicate; and if desired (4) a layer of silicone rubber or silicone adhesive. While the foregoing represents the simplest assemblies obtained from this invention, there are many possible variations including laminates in which the simplest combinations are repeated; sandwich constructions, for example, silicone rubber could be adhered to both sides of a metal strip by the method of this invention, or a silicone adhesive could be adhered to one side and a silicone rubber to the other side of a base member. Numerous other variations of the basic structures set forth above will be apparent to those skilled in the art and are to be considered within the scope and spirit of this invention.

The assemblies produced by the method of this invention and included herein have many uses including the adhesion of metal panels to the fuselage of an airplane, adhering silicone rubber to the body of an automobile, and many other uses wherein silicone rubber and/or silicone adhesive is bonded to a base member. Pressure-sensitive tapes which can be prepared by the method of this invention are useful as medicinal tapes for bandaging the human body and as packaging tapes for sealing bundles. These tapes can also be used for insulating electrical conductors and for the sealing of voids.

Any method can be employed for constructing the assemblies of this invention. The preferred method of producing these assemblies is set forth in the examples which follow. These examples are intended to aid those skilled in the art to better understand this invention and should not be construed as limiting the invention which is properly delineated in the appended claims.

*Example 1*

Unless otherwise specified, all parts and percentages in this and the examples which follow are based on weight.

An aluminum foil backing of 3 mil thickness was coated with a dried titanium compound by dipping the foil in a solution of 2 per cent tetrabutyl titanate in essentially water-free V. M. and P. naphtha and air-drying the coating for one minute. One side of the backing was then coated with a partially vulcanized organopolysiloxane rubber prepared by mixing 100 parts of a copolymer of 99.811 mol per cent dimethylsiloxane and .189 mol per cent methylvinylsiloxane, 64 parts of a calcium carbonate filler available commercially as Calcene N. C., and 4 parts ethyl polysilicate and heating the mixture for 3 hours at 250° C., then admixing therewith 3.2 parts of dichloro benzoyl peroxide. The mixture was dissolved in xylene to 50 per cent solids in solution. The solution was brushed onto the dried titanium compound on one side of the backing and the solvent was evaporated by heating at 70° C. for 40 minutes in an air circulating oven. The organopolysiloxane rubber was partially cured by heating at 150° C. for 5 minutes in the oven. As the final step, a silicone adhesive layer was anchored to the organopolysiloxane rubber. The adhesive consisted of 50 parts of an organosiloxane composed of trimethylsiloxane units and $SiO_2$ units, having about 1.2 methyl units per silicon atom in the copolymer, 50 parts of a dimethylsiloxane having a viscosity in excess of 10,000,000 cs. at 25° C., having a plasticity of 55, and 1.5 parts of benzoyl peroxide. These components were admixed and dissolved in xylene to 50 per cent solids in solution. The solution was brushed onto the tape and the solvent was driven off by heating at 70° C. for 40 minutes. A partial cure was effected by heating for 5 minutes at 150° C. The tape thus prepared was found to have excellent adhesion to a wide variety of solid materials including ceramics, glass, metals, human skin, plastics and many other similar materials. The adhesive layer was firmly anchored to the backing and did not peel off the backing as the tape was pulled from a surface to which it had been stuck. The backing was carefully cut without cutting the adhesive. The tape was then pulled apart and the adhesive remained firmly anchored to the backing. This tape was in all ways a practical and superior adhesive tape.

*Example 2*

Employing the method of Example 1, a pressure-sensitive adhesive tape was prepared employing as a backing an oriented film of a copolymer of ethylene glycol and terephthalic acid (available commercially as Mylar). The tetrabutyl titanate film was deposited as in Example 1. The organopolysiloxane rubber next deposited consisted of 200 parts of a copolymer of 92.5 mol per cent dimethylsiloxane units and 7.5 mol per cent phenylmethylsiloxane units having a viscosity of about 140,000 cs. at 25° C., 60 parts diatomaceous earth available commercially as Celite Super Floss, 6 parts ethyl polysilicate, 1 part lead octoate and 1 part iron oxide. This organopolysiloxane was spread on the tape with a spatula and cured at 150° C. for 5 minutes. The adhesive silicone was then deposited on the tape as in Example 1. The resulting adhesive tape was equivalent to that obtained in Example 1.

*Example 3*

Equivalent results are obtained when tetra 2-ethylhexyl titanate, octylene glycol titanate, tetraisopropyl titanate, tetramethyl titanate, tetradodecyl titanate and/or $Ti(OCH_2CH_2CH_2CH=CH_2)_4$ is substituted for the tetrabutyl titanate in the method of Example 1.

*Example 4*

An aluminum panel of 64 mils thickness was coated with (a) a mixture of titanium compound and ethyl polysilicate by dipping the panel in a mixture of 75 per cent tetrabutyl titanate and 25 per cent ethyl polysilicate in V. M. and P. naphtha solution containing 2 per cent solids. The coated panel was air dried for 15 minutes. The coated aluminum panel was then coated with (b) a partially vulcanized organopolysiloxane rubber prepared by mixing 100 parts of a copolymer of 99.811 mol per cent $(CH_3)_2SiO$ and .189 mol per cent methylvinylsiloxane, 64 parts of a calcium carbonate filler available commercially as Calcene N. C., and 4 parts ethyl polysilicate and heating the mixture for 3 hours at 250° C., then admixing therewith 3.2 parts of dichlorobenzoyl peroxide. The panel was dipped in the paste prepared as above, and the organopolysiloxane rubber was cured at 200° C. for thirty minutes. The aluminum panel was then given a final coating with (c) a room temperature vulcanizing silicone rubber prepared by admixing 200 parts of dimethylsiloxane polymer having a viscosity of about 15,000 cs. at 25° C., 60 parts of diatomaceous earth available commercially as Celite Super Floss, 3 parts ethyl polysilicate and 1 part lead octoate. The panel was dipped in the organopolysiloxane paste and cured at room temperature. The organopolysiloxane rubber (c) was found to be securely adhered to the aluminum panel. The silicone rubber was cut from the aluminum panel at one corner. The silicone rubber could not be pulled away from the panel. The rubber was so firmly adhered to the panel that the rubber was torn internally without destroying the bond between rubber and aluminum. The adhesion between the rubber and the aluminum panel was greater than the cohesive strength of the rubber itself.

A control panel was similarly dipped and cured in the same organopolysiloxanes as above but without the priming coating of titanate and ethyl polysilicate. The silicone rubber was easily and cleanly stripped from the panel. Control and test panels were heated for 24 hours at 250° C. and again in the control panel the silicone rubber was easily stripped from the panel whereas the panel which had been coated with the ethyl polysilicate-tetrabutyl titanate mixture was firmly adhered to the silicone rubber and attempts to separate the rubber from the panel failed with the rubber tearing internally without separation of the rubber to aluminum bond. A second control panel was coated with the identical titanate-ethyl polysilicate mixture and coated with a silicone rubber free of alkyl polysilicate. The silicone rubber could be stripped off the panel with ease thus showing that the silicone rubber in the layer next to the titanate primer must contain alkyl polysilicate else no bonding will be achieved.

*Example 5*

Equivalent results are obtained when the method of Example 4 is employed with tetrabutyl titanate in place of the tetrabutyl titanate-ethyl polysilicate mixture of that example and steel, cadmium steel, nickel, tin, copper glazed or unglazed porcelain, phenolic resin laminates, silicone resin laminates, silicone molding compounds, epoxide casting resin, and/or glass cloth coated with silicone varnish is employed in the place of the aluminum panel of Example 4.

Example 6

Equivalent results are obtained when a silicone rubber free of any alkyl polysilicate is substituted for the final coating (c) of room temperature vulcanizing silicone rubber of Example 4.

That which is claimed is:

1. A method of adhering silicone rubber to the surface of a solid comprising: (a) depositing on the surface of the solid a continuous coating consisting essentially of 50 to 100 per cent by weight of a titanium compound selected from the group consisting of titanium compounds of the general formula $Ti(OR)_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl groups per molecule, and 0 to 50 per cent by weight of a partially hydrolyzed alkyl polysilicate; and (b) depositing on the surface of the layer (a), a coating consisting essentially of (1) 1 to 10 per cent by weight of a partially hydrolyzed alkyl polysilicate, (2) 90 to 99 per cent by weight of a toluene soluble organopolysiloxane consisting essentially of 50 to 100 mol per cent dimethylsiloxane and 0 to 50 mol per cent of an organopolysiloxane of the general formula $$R_n SiO_{\frac{4-n}{2}}$$

where R represents any monovalent hydrocarbon radical and $n$ has an average value of about 2.

2. A method of adhering silicone rubber to the surface of a solid comprising: (a) depositing on the surface of the solid a continuous coating consisting essentially of 50 to 100 per cent by weight of a titanium compound selected from the group consisting of titanium compounds of the general formula $Ti(OR)_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl groups per molecule, and 0 to 50 per cent by weight of a partially hydrolyzed alkyl polysilicate; (b) depositing on the surface of the layer (a), a coating consisting essentially of (1) 1 to 10 per cent by weight of a partially hydrolyzed alkyl polysilicate, (2) 90 to 99 per cent by weight of a toluene soluble organopolysiloxane consisting essentially of 50 to 100 mol per cent dimethylsiloxane and 0 to 50 mol per cent of an organopolysiloxane of the general formula $$R_n SiO_{\frac{4-n}{2}}$$

where R represents any monovalent hydrocarbon radical and $n$ has an average value of about 2; and (c) depositing on the surface of the layer (b) a coating consisting essentially of a toluene soluble organopolysiloxane which is free of alkyl polysilicate and having the general unit formula $$R_n SiO_{\frac{4-n}{2}}$$

where R is any monovalent hydrocarbon radical and $n$ has a value of from 1.99 to 2.0 inclusive.

3. A method of adhering silicone rubber to the surface of a solid comprising: (a) depositing on the surface of the solid a continuous coating consisting essentially of 50 to 100 per cent by weight of a titanium compound selected from the group consisting of titanium compounds of the general formula $Ti(OR)_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl groups per molecule, and 0 to 50 per cent by weight of a partially hydrolyzed alkyl polysilicate; (b) depositing on the surface of the layer (a), a coating consisting essentially of (1) 1 to 10 per cent by weight of a partially hydrolyzed alkyl polysilicate, (2) 90 to 99 per cent by weight of a toluene soluble organopolysiloxane consisting essentially of 50 to 100 mol per cent dimethylsiloxane and 0 to 50 mol per cent of an organopolysiloxane of the general formula $$R_n SiO_{\frac{4-n}{2}}$$

where R represents any monovalent hydrocarbon radical and $n$ has an average value of about 2; and (c) depositing on the surface of layer (b) a coating comprising a silicone adhesive.

4. A method of adhering silicone rubber to the surface of a solid comprising: (a) depositing on the surface of the solid a continuous coating consisting essentially of 50 to 100 per cent by weight of a titanium compound selected from the group consisting of titanium compounds of the general formula $Ti(OR)_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl groups per molecule, and 0 to 50 per cent by weight of a partially hydrolyzed alkyl polysilicate; (b) depositing on the surface of the layer (a), a coating consisting essentially of (1) 1 to 10 per cent by weight of a partially hydrolyzed alkyl polysilicate, (2) 90 to 99 per cent by weight of a toluene soluble organopolysiloxane consisting essentially of 50 to 100 mol per cent dimethylsiloxane and 0 to 50 mol per cent of an organopolysiloxane of the general formula $$R_n SiO_{\frac{4-n}{2}}$$

where R represents any monovalent hydrocarbon radical and $n$ has an average value of about 2; and (c) depositing on the surface of layer (b) a silicone adhesive consisting essentially of 5 to 70 per cent by weight of a benzene soluble resin copolymer of $SiO_2$ units and $R_3SiO_{1/2}$ units, where R is selected from the group consisting of alkyl radicals of less than 4 carbon atoms and phenyl radicals, and having a ratio of $R_3SiO_{1/2}$ units to $SiO_2$ units in the copolymer of from .6:1 to .9:1 inclusive, and 95 to 30 per cent by weight of a diorganopolysiloxane having the general formula $R'_2SiO$, where R' is selected from the group consisting of methyl and phenyl and having a viscosity of at least 1,000,000 cs. at 25° C., and at least 90 per cent of the total number of R and R' radicals being alkyl.

5. As an article of manufacture, a bonded assembly comprising successive layers of a solid base member coated with: (a) a composition consisting essentially of 50 to 100 per cent by weight of a titanium compound selected from the group consisting of titanium compounds of the general formula $Ti(OR)_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl groups per molecule, and 0 to 50 per cent by weight of a partially hydrolyzed alkyl polysilicate; and (b) on the surface of layer (a), a coating consisting essentially of (1) 1 to 10 per cent by weight of a partially hydrolyzed alkyl polysilicate, and (2) 90 to 99 per cent by weight of a toluene soluble organopolysiloxane consisting essentially of 50 to 100 mol per cent dimethylsiloxane and 0 to 50 mol per cent of an organopolysiloxane of the general formula $$R_n SiO_{\frac{4-n}{2}}$$

where R represents any monovalent hydrocarbon radical and $n$ has an average value of about 2.

6. The method of manufacturing pressure-sensitive adhesive tapes which comprises depositing on a flexible backing successive layers comprising: (a) a dried coating of a titanium compound selected from the group consisting of titanium compounds of the general formula Ti(OR)$_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl radicals per molecule; (b) on the dried surface of said titanium compound, on one side of the backing only, a layer of an organopolysiloxane consisting essentially of 1 to 10 per cent by weight of a partially hydrolyzed alkyl polysilicate and 90 to 99 per cent by weight of a toluene soluble organopolysiloxane consisting essentially of 50 to 100 mol per cent dimethylsiloxane units, 0 to 50 mol per cent organosiloxane units of the formula R$_n$SiO, where R represents monovalent hydrocarbon radicals and $n$ has an average value of about 2, and a vulcanizing agent; heating the assembly to vulcanize layer (b) and thereafter applying on the surface of layer (b), (c) a silicone adhesive.

7. As an article of manufacture, a pressure-sensitive adhesive tape comprising a flexible material having deposited thereon successive layers comprising: (a) a dried coating of a titanium compound selected from the group consisting of titanium compounds of the general formula Ti(OR)$_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl radicals; (b) on the dried surface of said titanium compound, on one side of the backing only, a layer of a vulcanized organopolysiloxane rubber consisting essentially of 1 to 10 per cent by weight of a partially hydrolyzed alkyl polysilicate and 90 to 99 per cent by weight of a toluene soluble organopolysiloxane consisting essentially of 50 to 100 mol per cent dimethylsiloxane units and 0 to 50 mol per cent organosiloxane units of the formula R$_n$SiO, where R represents monovalent hydrocarbon radicals and $n$ has an average value of about 2; and (c) on the surface of layer (b), a silicone adhesive.

8. As an article of manufacture, a pressure-sensitive adhesive tape comprising a flexible material having deposited thereon successive layers comprising: (a) a dried coating of a titanium compound selected from the group consisting of titanium compounds of the general formula Ti(OR)$_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl radicals; (b) on the dried surface of said titanium compound, on one side of the backing only, a layer of a vulcanized organopolysiloxane rubber consisting essentially of 1 to 10 per cent by weight of a partially hydrolyzed alkyl polysilicate and 90 to 99 per cent by weight of a toluene soluble organopolysiloxane consisting essentially of 50 to 100 mol per cent dimethylsiloxane units, 0 to 50 mol per cent organosiloxane units of the formula R$_n$SiO, where R represents monovalent hydrocarbon radicals and $n$ has an average value of about 2; and (c) on the surface of layer (b), a silicone adhesive consisting essentially of 5 to 70 per cent by weight of a benzene soluble resin copolymer of SiO$_2$ units and R$_3$SiO$_{1/2}$ units, where R is selected from the group consisting of alkyl radicals of less than 4 carbon atoms and phenyl radicals, and where the ratio of R$_3$SiO$_{1/2}$ units to SiO$_2$ units in the copolymer is from .6:1 to .9:1 inclusive, and 95 to 30 per cent by weight of a diorganopolysiloxane having the general formula R′$_2$SiO, where R′ is selected from the group consisting of methyl and phenyl and having a viscosity of at least 1,000,000 cs. at 25° C., and at least 90 per cent of the total number of R and R′ radicals being alkyl.

9. The article of manufacture of claim 7 in which the silicone adhesive (c) consists essentially of 5 to 70 per cent by weight of a benzene soluble copolymer of SiO$_2$ units and (CH$_3$)$_3$SiO$_{1/2}$ units, and where the ratio of (CH$_3$)$_3$SiO$_{1/2}$ units to SiO$_2$ units is from .6:1 to .9:1 inclusive, and 95 to 30 per cent by weight of a dimethylsiloxane polymer having a viscosity of at least 1,000,000 cs. at 25° C.

10. As an article of manufacture, a pressure-sensitive adhesive tape comprising a flexible material having deposited thereon successive layers comprising: (a) a dried coating of tetrabutyl titanate; (b) on the dried surface of said tetrabutyl titanate, on one side of the backing only, a layer of a vulcanized organopolysiloxane rubber consisting essentially of 1 to 10 per cent by weight of a partially hydrolyzed alkyl polysilicate and 90 to 99 per cent by weight of a toluene soluble organopolysiloxane consisting essentially of 50 to 100 mol per cent dimethylsiloxane units, 0 to 50 mol per cent organosiloxane units of the formula R$_n$SiO, where R represents monovalent hydrocarbon radicals and $n$ has an average value of about 2; and (c) on the surface of layer (b), a silicone adhesive consisting essentially of 5 to 70 per cent by weight of a benzene soluble resin copolymer of SiO$_2$ units and R$_3$SiO$_{1/2}$ units, where R is selected from the group consisting of alkyl radicals of less than 4 carbon atoms and phenyl radicals, and where the ratio of R$_3$SiO$_{1/2}$ units to SiO$_2$ units in the copolymer is from .6:1 to .9:1 inclusive, and 95 to 30 per cent by weight of a diorganopolysiloxane having the general formula R′$_2$SiO, where R′ is selected from the group consisting of methyl and phenyl and having a viscosity of at least 1,000,000 cs. at 25° C., and at least 90 per cent of the total number of R and R′ radicals being alkyl.

11. As an article of manufacture, a pressure-sensitive adhesive tape comprising a flexible backing composed of an oriented film of a copolymer of ethylene glycol and terephthalic acid, and having deposited thereon successive layers comprising: (a) a dried coating of a titanium compound selected from the group consisting of titanium compounds of the general formula Ti(OR)$_4$ and hydrocarbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl radicals; (b) on the dried surface of said titanium compound, on one side of the backing only, a layer of a vulcanized organopolysiloxane rubber consisting essentially of 1 to 10 per cent by weight of a partially hydrolyzed alkyl polysilicate and 90 to 99 per cent by weight of a toluene soluble organopolysiloxane consisting essentially of 50 to 100 mol per cent dimethylsiloxane units, 0 to 50 mol per cent organosiloxane units of the formula R$_n$SiO, where R represents monovalent hydrocarbon radicals and $n$ has an average value of about 2; and (c) on the surface of layer (b), a silicone adhesive.

12. As an article of manufacture, a pressure-sensitive adhesive tape comprising a flexible backing composed of an oriented film of a copolymer of ethylene glycol and terephthalic acid, and having deposited thereon successive layers comprising: (a) a dried coating of a titanium compound selected from the group consisting of titanium compounds of the general formula Ti(OR)$_4$ and hydrocrbon soluble partial hydrolyzates thereof in which compounds R is selected from the group consisting of aliphatic hydrocarbon radicals of less than 13 carbon atoms, and hydroxylated aliphatic hydrocarbon radicals of less than 13 carbon atoms and containing less than 4 hydroxyl radicals; (b) on the dried surface of said titanium compound, on one side of the backing only, a layer of a vulcanized organopolysiloxane rubber consisting essentially of 1 to 10 per cent by weight of a partially hydrolyzed alkyl polysilicate and 90 to 99 per cent by weight of a toluene soluble organopolysiloxane consisting essentially of 50 to 100 mol per cent dimethylsiloxane units, 0 to 50 mol per cent organosiloxane units of the formula $R_nSiO$, where R represents monovalent hydrocarbon radicals and $n$ has an average value of about 2; and (c) on the surface of layer (b), a silicone adhesive consisting essentially of 5 to 70 per cent by weight of a benzene soluble resin copolymer of $SiO_2$ units and $R_3SiO_{1/2}$ units, where R is selected from the group consisting of alkyl radicals of less than 4 carbon atoms and phenyl radicals, and where the ratio of $R_3SiO_{1/2}$ units to $SiO_2$ units in the copolymer is from .6:1 to .9:1 inclusive, and 95 to 30 per cent by weight of a diorganopolysiloxane having the general formula $R'_2SiO$, where R' is selected from the group consisting of methyl and phenyl and having a viscosity of at least 1,000,000 cs. at 25° C., and at least 90 per cent of the total number of R and R' radicals being alkyl.

No references cited.